United States Patent
Stahl et al.

(10) Patent No.: US 9,041,729 B1
(45) Date of Patent: May 26, 2015

(54) GRAPHICAL DESIGN TOOL

(75) Inventors: Ted Stahl, Grosse Pointe Woods, MI (US); Greg Peirce, Mesa, AZ (US); Clint Phillips, Mesa, AZ (US); Fernando Luis Cacciola Carballal, Buenos Aires (AR)

(73) Assignee: Stahls' SCS, St. Clair Shores, MI (US)

( * ) Notice: Subject to any disclaimer, the term of this patent is extended or adjusted under 35 U.S.C. 154(b) by 2108 days.

(21) Appl. No.: 12/110,000

(22) Filed: Apr. 25, 2008

(51) Int. Cl.
*G06T 11/20* (2006.01)
*G09G 5/00* (2006.01)
*G06F 3/0484* (2013.01)

(52) U.S. Cl.
CPC .............. *G06T 11/20* (2013.01); *G06F 3/0484* (2013.01)

(58) Field of Classification Search
None
See application file for complete search history.

(56) References Cited

U.S. PATENT DOCUMENTS

| 7,385,612 | B1* | 6/2008 | Peterson | 345/619 |
| 2003/0001864 | A1* | 1/2003 | Charpentier | 345/619 |
| 2007/0214415 | A1* | 9/2007 | Williams | 715/700 |

OTHER PUBLICATIONS

Declaration of Sabra Otterness Mar. 31, 2008.
Declaration of Clint Phillips Mar. 13, 2008.
Apple; Website Article entitled "Aperture Designed for Professional Photographers" Mar. 14, 2008.

* cited by examiner

*Primary Examiner* — Tize Ma
(74) *Attorney, Agent, or Firm* — Fishman Stewart Yamaguchi PLLC

(57) ABSTRACT

A set of graphical data is stored, the set of graphical data including a first representation of an image in each of a first format and a second format. A set of processes that are organized according to a specified order is stored. The processes are applied, in the specified order, to the graphical data, thereby generating a second representation of the image in each of the first format and the second format.

22 Claims, 14 Drawing Sheets

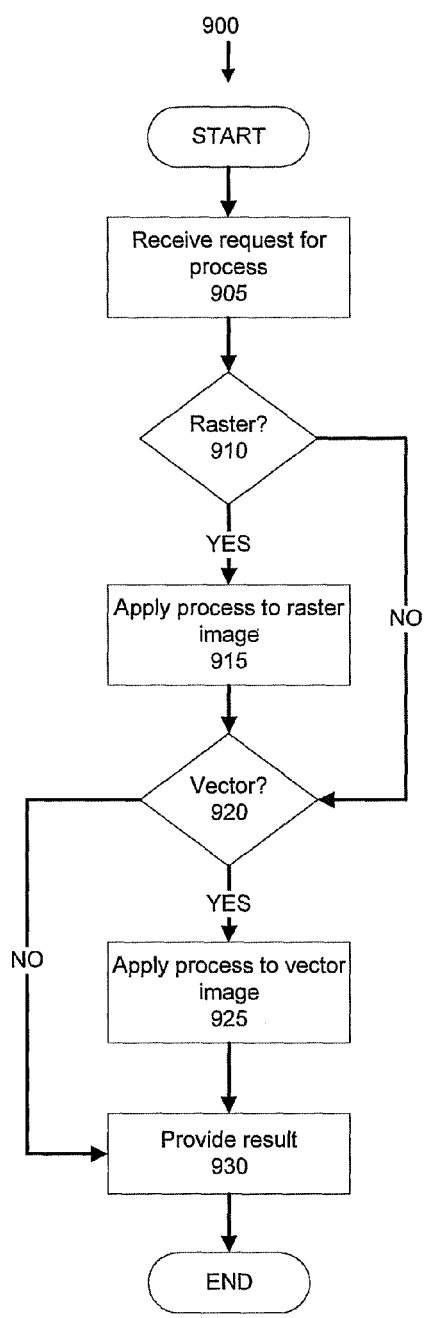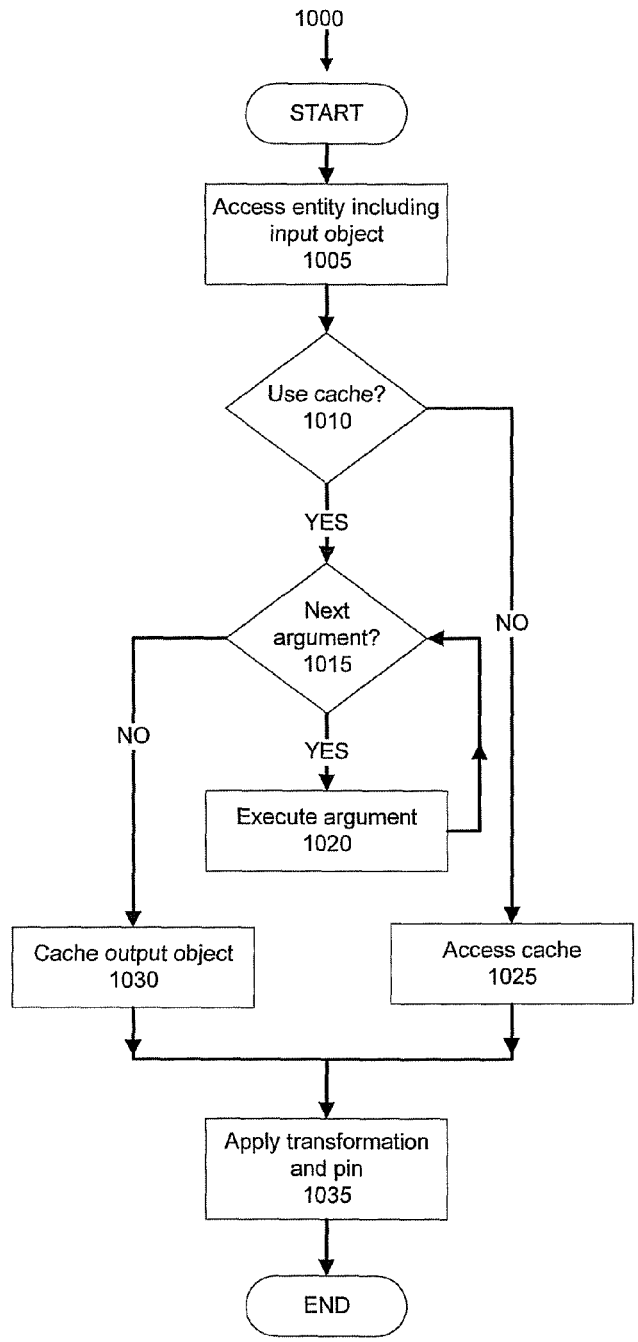
FIG. 9
FIG. 10

GRAPHICAL DESIGN TOOL

BACKGROUND

Computer-aided design for graphics, including text, emblems, logos, images, and the like allows users to create graphical images for reproduction on items such as apparel, e.g., shirts, jackets, jerseys, etc. However, present systems for creating, editing, and reproducing such graphical images do not allow users to easily edit and modify the graphical images, particularly when the graphical images include one or more components, e.g., text strings, shapes, etc. It is generally not possible, for example, to combine and then re-order various graphical effects, e.g., text effects such as shadowing, stretching, re-shaping, etc. Generally, treating a text string as an image converts the text string to a bitmap or other image format, and destroys the ability to manipulate the image while maintaining awareness as to the content of the text string. Thus, performing a variety of operations, including correcting mis-spelled words, editing the text, changing font properties, etc. are not possible. Further, working with vector data and raster data together is often cumbersome, to the extent it is possible at all. Present systems generally rely on raster data for rendering graphical images in a computer display, and forego information provided by vector graphic data associated with such images. Present systems also suffer from yet further deficiencies, such as undesirably high use of processing overhead.

BRIEF DESCRIPTION OF THE DRAWINGS

FIG. 2b illustrates an example of further editing of text strings following the weld operation of FIG. 2a.

FIG. 3b illustrates an example of further editing of text strings following the weld operation of FIG. 3a.

FIG. 4b illustrates a process chain including a single process, i.e., the stretching process applied as illustrated in FIG. 4a.

FIG. 5b illustrates a process chain that includes processes applied to the image of the text string shown in FIG. 5a.

FIG. 6b illustrates a process chain that includes processes applied to the image of the text string shown in FIG. 6a.

FIG. 9 illustrates an exemplary process flow for processing graphic image data including type data such as raster data and vector data.

FIG. 10 illustrates an exemplary process flow for executing a process chain.

DETAILED DESCRIPTION OF PREFERRED EMBODIMENTS

Figure 1:
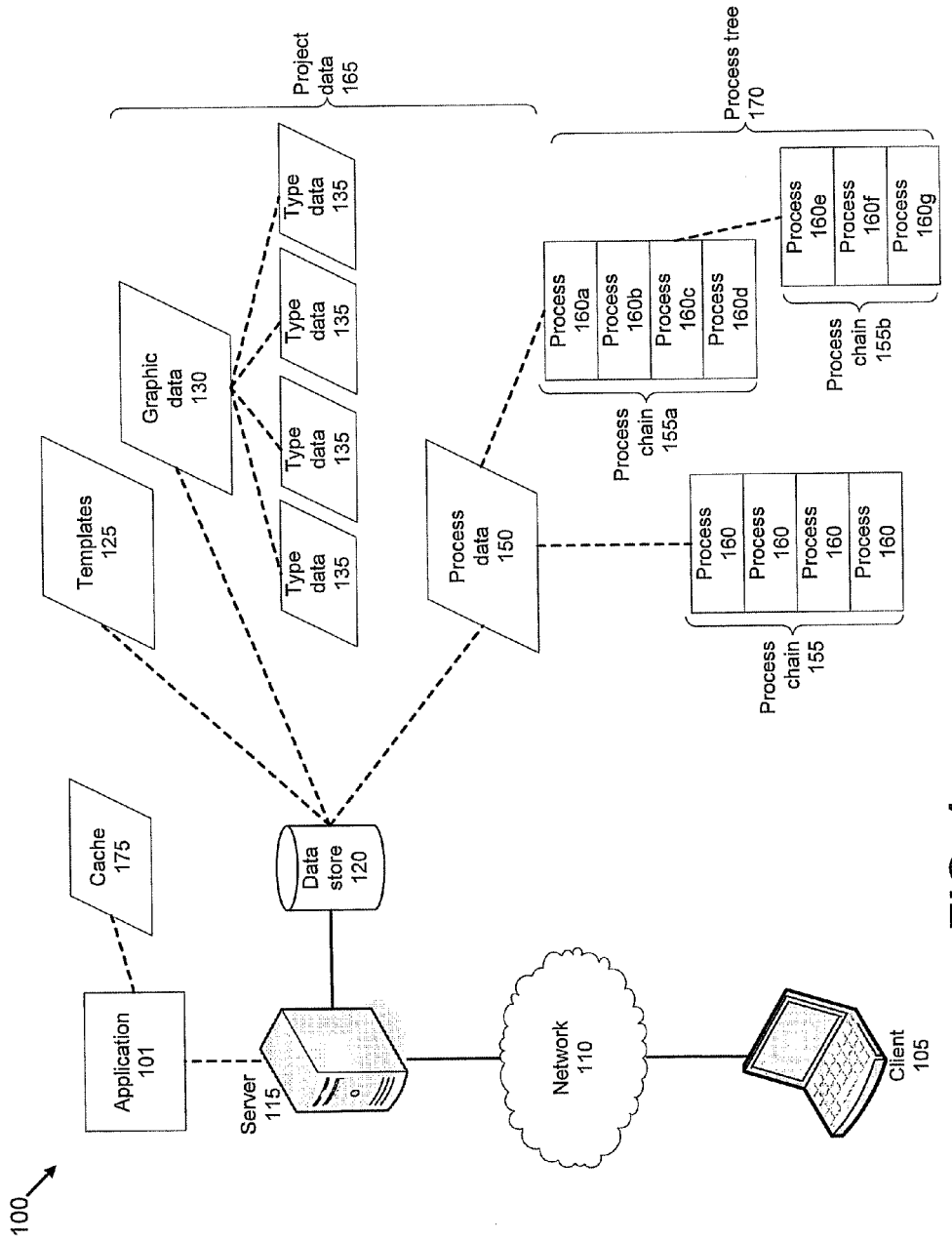
FIG. 1 illustrates an exemplary system for providing a web design software application.

FIG. 1 illustrates an exemplary system 100 for providing a web design software application 101. A client 105 accesses the application 101 through a network 110 that provides communications for devices such as the client 105 and a server 115 that hosts the application 101. Server 115 is further communicatively coupled to a data store 120, possibly through the network 110, or more likely through a local area network (LAN) or the like. Data store 120 includes a variety of data used to support application 101, including templates 125, graphic data 130, and process data 160. Graphic data 130 generally includes type data 135, i.e., data specific to particular types of graphic data 130, such as raster data, vector graphic data, character data, text string data, etc. Type data 135 and process data 150 are further sometimes collectively referred to as project data 165.

Client 105 allows a user to communicate through network 110, e.g., to interact with server 115. Client 105 may be any one of a number of computing devices that include one or more software applications, e.g., a web browser, various plug-ins or add-ins, device drivers, network connections, etc., for facilitating such communications. For example, client 105 may be a desktop computer, a laptop computer, a mainframe computer, a mini-computer, handheld computer, etc. Also, while only one client 105 is shown in FIG. 1, many different clients 105 may, and often will, access network 110 and/or server 115 at the same or nearly the same time.

Client 105 generally communicates with server 115 and accesses application 101 via network 110. Network 110 may include any medium or media capable of transmitting data between client 105 and search engine 115, such as the Internet, a local area network, a wide area network, a cellular network, etc. Server 115 may accept a request submitted by client 105, and may in turn query data store 120. It is to be understood that server 115 may be any device or combination of devices configured to receive information from one or more clients 105, and to in turn communicate with data store 120. In general, server 115 may be any device or combination of devices capable of hosting and operating application 101, for example, a server computer, a desktop computer, a web server, a mainframe computer, a computing cluster, or the like.

Server 115 may include one or more web servers, which may facilitate access to client 105. Accordingly, server 115, according to instructions included in application 101, generally provides client 105 with a graphical user interface (GUI) such as a web page, hypertext markup language (HTML) page or the like. Such GUIs are typically accessible through a web browser or a client application that is included within client 105. Further, client 105 may display other kinds of user interfaces, such as a text-only interface, or any other interface capable of transmitting queries and receiving query results from search engine 115. Server 115 selectively communicates with data store 120.

Data store 120 may include one or more relational databases. Alternatively or additionally, data store 120 may include one or more object-oriented or hierarchical databases, or other mechanisms for storing and accessing data, including arrays, pointers, flat files, etc. As mentioned above, data store 120 may be included in a separate computing device from server 115 that hosts application 101. Alternatively or additionally, data store 120 may be included on a same computing device as application 101.

Data store 120 generally, although not necessarily, includes one or more templates 125. Templates 125 include graphic data 130, and generally also process data 150, that has been prearranged for access and use by a user of client 105. Thus, a template 125 may include a set of project data 150. However, as described further below, templates 125 may simply include a predefined process chain 155, and/or may be further manipulated, rearranged, modified, or supplemented by a user.

Graphic data 130 advantageously stores data concerning a graphic image, or set of graphic images, in a context-sensitive fashion. That is, in addition to data about how an image is drawn or rendered, such as type data 135, graphic data 130 includes data relevant to further manipulation or transformation of an image included in graphic data 130. For instance, graphic data 130 may include a text string, for which it is important to maintain information relating to up and down directions, the beginning and end of the string, etc. For example, if graphic data 130 includes a text string that is to be split into two parts to accommodate printing on the front of a jersey that buttons or zips up the front, it can be important to track individual letters of the text string to split the image between two of the letters rather than in the middle of one of the letters. Similar information may be maintained for geometric shapes.

Similarly, graphic data 130 may include two text-string images that are to be welded into a single string, i.e., a union operation is to be performed. Conventional image processing systems would merge or "weld" the text strings together, converting the result to solely image data such as raster data 130, or simple lines and curves that do not retain any contextual information about the text, etc., and destroying any information relating to the text string, e.g., information that would allow spell-checking to be performed. In contrast, processes 160, described below, preserve contextual information such as information regarding text in a string such that two strings welded together could later be split or otherwise manipulated. Context information is particularly important with respect to text data. For example, the orientation of a string of text, e.g., whether it is upside-down, should be read left-to-right, etc., can be important in applying effects to the image of the text string. Context information may be stored and accessed in a variety of ways. For example, as discussed in further detail below, extensible markup language (XML) may be used to provide context information to application 101.

As mentioned above, type data 135 may include raster data that is generally stored in a binary format that includes information about various pixels or rasters that are included in graphic data 130. Raster data is sometimes referred to as a bitmap. Formats for raster data include JPEG (joint photographic experts group), GT (graphical interchange format), PNG (portable network graphics), etc. Raster data is commonly used for display of graphical images within displays associated with computing devices such as client 105.

Graphic data 130 may also include type data 135 for vector graphic data. Vector graphic data may include instructions for drawing images according to geometric constructs such as lines, circles, etc. Vector graphic data may be formatted according to standards such as Scalable Vector Graphics (SVG) or the like. Vector graphic data is useful for printing operations. Many printing machines, e.g., machines that print images on shirts, jackets, and other apparel, require vector graphic data as input.

Further, graphic data 130 may include type data 135 for character data and/or text string data. Character data may be included in text string data inasmuch as a text string is a string, or array, of characters. In general, character data includes information such as an identifier for a font in which a character is rendered, a size of the font, etc. Text string data includes information such as identifiers for characters that are included in the text string, kerning, text effects such as shadows, contours, and the like, etc.

As can be seen in FIG. 1, graphic data 130 may include type data 135 in a simple hierarchy. A representation of graphic data 130 is at a top level of the hierarchy, and representations of type data 135, which may include a variety of types as noted above, including without limitation, raster data, vector graphic data, character data, and/or text string data, are at a lower level of the hierarchy.

Application 101 may be implemented using one or more object-oriented programming languages, such a Java, C++, C#, etc., although it is to be understood that application 101 could be implemented without relying on an object-oriented language. Use of an object-oriented language allows graphic data 130 to be implemented to take advantage of polymorphism offered by such object-oriented programming languages. Thus, a parent class representing graphic data 130 may provide inherited methods and properties for classes respectively representing different type data 135, such as raster data and vector graphic data. The classes respectively representing different type data such as raster data and vector data may further each provide additional methods and properties specific to the class. From the standpoint of application 101, representing graphic data 130 in this hierarchical, object-oriented fashion provides the advantage that a single graphic data 130 object may include different type data 135, e.g., raster data, vector graphic data, character data, and text string data. Thus, manipulations of different type data 135, e.g., raster data and vector graphic data, may be performed together by a single method or function call, using parameters that are commonly applied to each of the raster data and vector data.

For example, an operation that may commonly be applied to graphic data 130 is a rotation of a graphical image, e.g., forty-five degrees in a clockwise direction. Assume that graphic data 130 includes both a raster data and a vector graphic data representation of a graphic image. Further assume that a class representing graphic data 130 includes a "rotate clockwise" method, the method taking as a parameter a number between zero and 360, i.e., a number of degrees. In this example, then, calling the "rotate clockwise" method with a parameter of "45" would cause the graphic data 130 object to be rotated 45 degrees in a clockwise direction. Further, the "rotate clockwise" method could be called for a raster data object or a vector graphic data object to achieve a similar result for such object because the method would be "overloaded" to accommodate any one of a plurality of objects.

As noted above, vector graphic data is often needed to utilize printing machines, cutting machines, or the like that use vector graphic data to draw images, perform cutting operations, etc., e.g., draw images on apparel such as shirts, jackets, pants, and the like. However, raster data is commonly used to display such images on computing devices such as client 105, and to create, edit, and otherwise manipulate such images on such computing device. Accordingly, providing graphic data 130 that transparently includes a representation of a graphic image in the form of both raster data and vector graphic data provides the advantage of providing graphic data 130 in both a format convenient for display and manipulation on a computing device such as client 105 and for utilization of a machine such as a printing machine, cutting machine, or the like. Vector graphic data is also useful for performing resizing of images.

Process data 150 includes one and usually more process chains 155. Each process chain 155, in turn, includes a set of one or more processes 160, sometimes referred to as transformations, that may be applied to a set of graphic data 130, i.e., graphic data 130 including various type data 135. Instructions included in application 101 may then apply processes 160 stored in process data 150 to such graphic data 130 according to a process chain 155. As is also further described below, two or more process chains 155 may be linked together to form a process tree 170.

In general, process chains 155 may be represented in a variety of data structures, such as lists, trees, arrays, etc. Process chains 155 are generally ordered, i.e., the set of processes 160 included in a process chain 155 are indicated for execution in a particular order, one after the other. A first process 160 that is executed prior to a second process 160 in a process chain 155 may be referred to as "upstream" of the second process 160. Similarly, the second process 160 executed following the first process 160 in the process chain 155 may be referred to as "downstream" of the first process 160. As explained below, process chains 155 may be reordered. As also explained below, reordering a process chain 155 often alters the ultimate rendering of graphic data 130.

An example of a process 160 might include any operation, transformation, etc. that may be applied to graphic data 130. For example, in one implementation, application 101 includes shadow processes 160, contour processes 160, stretching processes 160, size changing processes 160, rotation processes 160, coloring processes 160, shading processes 160, etc.

Frequently, processes 160 include transformations that ordinarily would make use of a transformation known as an affine transformation. An affine transformation is a frequently-used mechanism for manipulating image data, and generally involves a linear transformation in addition to a position translation to ensure that output of the affine transformation is properly positioned. Unfortunately, affine transformations can be computationally expensive. In some cases, multiple processes 160 in a process chain 155 may require an affine transformation. However, it has been experimentally determined that multiple affine transformations in a process chain 155 may be avoided by simply performing a linear transformation for each process chain 155 that would ordinarily require an affine transformation, and then performing a final position translation. For example, as described below with reference to Tables 1 and 2, application 101 may keep track of a point on which graphic data 130 is centered in a coordinate system. The position translation may then include restoring graphic data 130 to this center-point. Advantageously, therefore, it is not necessary for application 101 to track affine transformations within a process chain 155, or to reposition graphic data 130, after application of individual processes 160 in a process chain 155.

Further, application 101 may use a cache 175 to reduce processing required for execution of a process chain 155. Cache 175 is generally included in memory of server 115, although cache 175 may be stored in data store 120. Inasmuch as a process chain 155 generally receives as input a set of graphic data 130, and provides a set of graphic data 130 as output, execution of a process chain 155 may be computationally expensive. However, it has been experimentally determined that certain processes 160 may conveniently be performed at the end, i.e., as the most downstream processes 160, of a process chain 155, prior to execution of the linear transformation and repositioning discussed above. Such processes 160 include what are sometimes referred to as "positioning" processes 160, such as rotation processes 160, stretching processes 160, skewing processes 160, etc. Accordingly, in one implementation, cache 175 is used to cache output from process chain 155 just prior to execution of any positioning processes 160 and the linear transformation and repositioning. Thus, the cache 175 allows positioning processes 160 to be executed relatively quickly, and therefore with minimal latency to the user, especially when compared to the latency that could result if an entire process chain 155 had to be executed simply to allow for execution of a positioning process 160.

As is further illustrated in FIG. 1, two or more process chains 155 may be linked together to form a process tree 170. For example, a first process chain 155a may include a set of processes 160a-160d. A second process chain 155b may include a set of processes 160e-160g. The second process chain 155b may be in effect incorporated into the first process chain 155a as a branch from process 160c, thereby forming process tree 170. When such an arrangement is implemented, the second process chain 155b is sometimes referred to as an "argument" to the process 160c. That is, in order for process 160c to be executed or performed, application 101 must call and execute the processes 160 in the second process chain 155b. After process 160c is executed, including the processes 160 in the second process chain 155b, process 160d in the first process chain 155a is then executed. Accordingly, process chains 155 may be advantageously combined to generate various graphical effects. Process trees 170 may allow processes 160 to be more efficiently executed than they would be otherwise.

The combination of a set of graphic data 130 along with processes 160 applied to the graphic data 130, e.g., a process chain 155, is considered to be an "entity" within application 101. A first entity may sometimes be included as an argument to a second entity. That is, process chains 155 may be arranged into process trees 170, as discussed in the preceding paragraph. In addition to incorporating a second process chain 155, as discussed in the preceding paragraph, sometimes an entity includes incorporating a second entity, i.e., new graphic data 130 as well as additional processes 155. Thus, a process chain 155 applied to graphic data 130 such as a block of text could be included in a process chain 155 applied to graphic data 130 including a shape such as a triangle.

As mentioned above, a template 125 may include a predetermined process chain 155. For example, a process chain 155 may include a first process 160 defining a color for a selected set of graphic data 130, a second process 160 applying a shadow to the selected set of graphic data 130, a third process 160 stretching the selected set of graphic data 130 in a horizontal direction, and a fourth process 160 applying a contour, e.g., an outline, to the selected set of graphic data 130. As discussed above, such graphic data 130 may be represented according to type data 135, e.g., as one or more of character data, text string data, raster data, and vector graphic data. For example, a template 125 may include a process chain 155, that when applied to a set of graphic data 130, effects transformations with respect to both raster data and vector graphic data included in the set of graphic data 130. Further, a template 125 may include graphic data 130 in addition to or in lieu of a process chain 155.

Moreover, some or all of project data 165 may be saved and/or used as a template 125. For example, a user of application 101 might import an image, e.g., "clip art," as graphic data 130. Such imported image usually includes raster data, which may be converted to vector graphic data, providing graphic data 130 that includes type data 135 for both raster data and vector graphic data representing the imported image. A process chain 155 of processes 160 may then be defined for the imported image. Either the process chain 155 or the graphic data 130 could be saved by itself as a template 125. Alternatively or additionally, the process chain 155 and graphic data 130 could be saved together as a template 125.

Process and Context Information

As mentioned above, information about processes 160, including process chains 155, and also information relating to what is referred to as "context information," may be stored and provided to application 101 in XML format. Table 1 provides an exemplary snippet of XML according to what is sometimes referred to as "CDL," for "concept description language."

TABLE 1

```
<Cd1>
  <Shape>
    <Brush Color="FFFFFF" />
    <Pin X="435" Y="–163.500" RX="401" RY="–145.500" />
    <Transform Matrix22="1.0000, 0.0000, 0.0000, 1.0000" />
    <Processes>
      <Contour Offset="5" Steps="1" Inside="false"
      Outside="true" IncludeHoles="true" Combine="false">
        <Brush Color="FF0000" />
      </Contour>
      <Shadow OffsetX="3.048" OffsetY="–3.048" Gap="0"
      Simplify="true" >
        <Brush Color="000000" />
      </Shadow>
    </Processes>
    <Polyregion>
      <Pen Color="000000"Alpha="0" />
      <Brush Color="FFFFFF" />
      <Region Type="Polyline" Points="57.73 0.00,28.86
      –49.99,0.00 –99.99,115.46 –99.99">
      <Pen Color="000000" Alpha="0" />
      <Brush Color="FFFFFF" />
      </Region>
    </Polyregion>
  </Shape>
</Cd1>
```

The XML shown in Table 1 describes graphic data 130, specifically, a shape that is colored black (hexadecimal FFFFFF). The "pin" tag provides coordinates showing where the shape is centered in a display. The "transform matrix" tag refers to the linear transformation applied at the end of a process chain 155, as discussed above. The "processes" tag refers to various processes 160 performed on the referenced shape. For example, a "contour" process 160 and a "shadow" process 160 are applied. These processes 160 together form a process chain 155. The "polyregion" tag includes attributes describing the shape, which in this example is a triangle, as can be seen by reviewing attributes associated with the "region" tag.

Table 2 provides another exemplary snippet of XML according to CDL for use by application 101.

TABLE 2

```
<Cd1>
  <TextBlock LineDirection="0">
    <Line>Sample</Line>
    <Font Guid="2e0ad4c9-d303-4e8b-88b9-0a39725e015f"
```

TABLE 2-continued

```
    Name="VX Problock" Style="Regular" Size="50.400"
    Spacing="0" />
    <Brush Color="000000" />
    <Pin X="200" Y="–161.500" />
    <Transform Matrix22="1.0000, 0.0000, 0.0000, 1.0000" />
    <Processes>
      <Contour Offset="5" Steps="1" Inside="false"
      Outside="true" IncludeHoles="true" Combine="false" >
        <Brush Color="FF0000" />
      </Contour>
      <Shadow OffsetX="–3.048" OffsetY="–3.048" Gap="0"
      Simplify="true" >
        <Brush Color="000000" />
      </Shadow>
    </Processes>
  </TextBlock>
</Cd1>
```

In the example of Table 2, graphic data 130 includes type data 135 for a text string, rather than a shape. The "LineDirection" attribute takes values of from zero to 360 degrees, indicating an orientation of the text. The "line" tag encloses the text string being displayed, "sample" in this example. The font for the text is indicated by a globally unique identifier (GUID) for the font, and also the name, style, size, and other attributes of the fonts may be provided. As further seen in Table 2, processes 160 applied to the block of text, in this example a contour process 160 and a shadow process 160, are also described. These processes 160 together form a process chain 155.

As can be seen from the exemplary XML snippets provided in Tables 1 and 2, a context for each process 160 that is applied to a shape, block of text, etc. may be discerned. For example, Table 2 includes a shadow process 160 occurring after a contour process 160. Accordingly, part of the context of the shadow process 160 is that it occurs after the contour process 160. As noted above, context is important, because, for example, changing the order of processes 160 in a process chain 155 may change the appearance of the text string, shape, etc. being displayed.

Each of the exemplary XML snippets provided in Tables 1 and 2 illustrate what is sometimes referred to as an "entity." That is, as mentioned above, the combination of a set of graphic data 130 along with processes 160, e.g., a process chain 155, is considered to be an "entity" within application 101. Table 3 provides an illustrative XML snippet including a second entity that is an argument to a first entity.

TABLE 3

```
<Cd1>
  <TextBlock LineDirection="0">
    <Line>Line 1</Line>
    <Font Guid="2e0ad4c9-d303-4e8b-88b9-0a39725e015f"
    Name="VX Problock" Style="Regular" Size="50.400"
    Spacing="0" />
    <Brush Color="000000" />
    <Pin X="200" Y="–161.500" />
    <Transform Matrix22="1.0000, 0.0000, 0.0000, 1.0000" />
    <Processes>
      <Weld>
        <TextBlock LineDirection="0">
          <Line>Line 2</Line>
          <Font Guid="2e0ad4c9-d303-4e8b-88b9-0a39725e015f"
          Name="VX Problock" Style="Regular" Size="50.400"
          Spacing="0" />
          <Brush Color="000000" />
          <Pin X="200" Y="–161.500" />
          <Transform Matrix22="1.0000, 0.0000, 0.0000, 1.0000" />
        </TextBlock>
      </Weld>
```

TABLE 3-continued

```
        </Processes>
      </TextBlock>
    </Cd1>
```

As seen in Table 3, a first text string entity includes the characters "Line 1." An argument to that first text string entity is a second text string entity that includes the characters "Line 2." According to the XML snippet provided in Table 3, the first text string is welded to the second text string.

Illustrative Graphical Manipulations

Figure 2A:
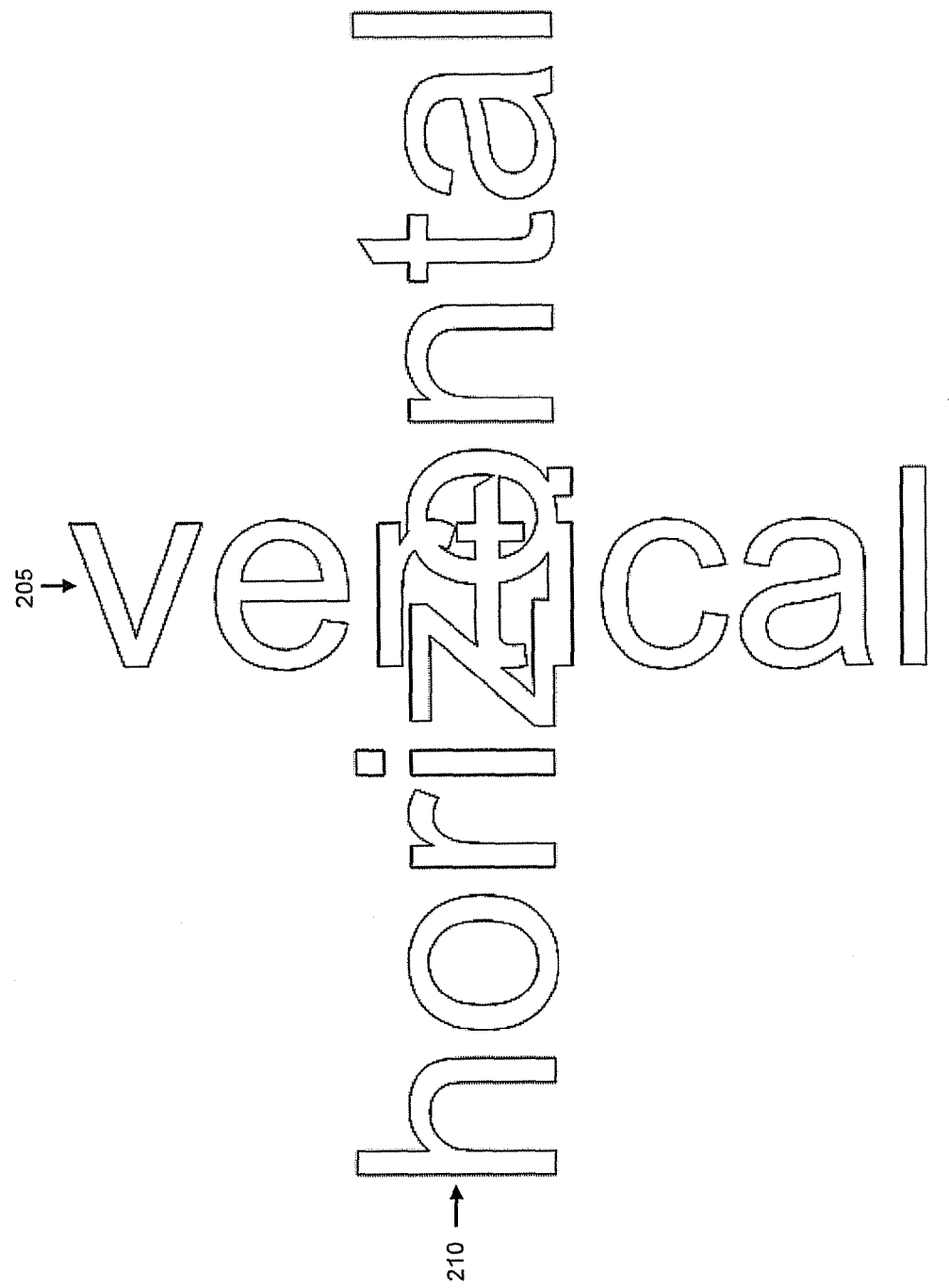
FIG. 2a provides an example of a "weld" operation of two text strings.

FIG. 2a illustrates an example of a "weld" operation of two text strings 205, 210 performed by application 101. That is, as seen in FIG. 2a, a first text string 205 is joined to a second text string 210. The joining of the two text strings 205, 210 is referred to as a "weld" because intersecting lines of characters of the text strings 205, 210 are merged together, rather than overlapping. The two text strings 205, 210 each by themselves, and also together, constitute sets of graphic data 130. Advantageously, application 101 preserves the context of each of text strings 205, 210 following the illustrated weld operation. Thus, further operations, such as operations illustrated in FIG. 2b, are easily facilitated.

Figure 2B:
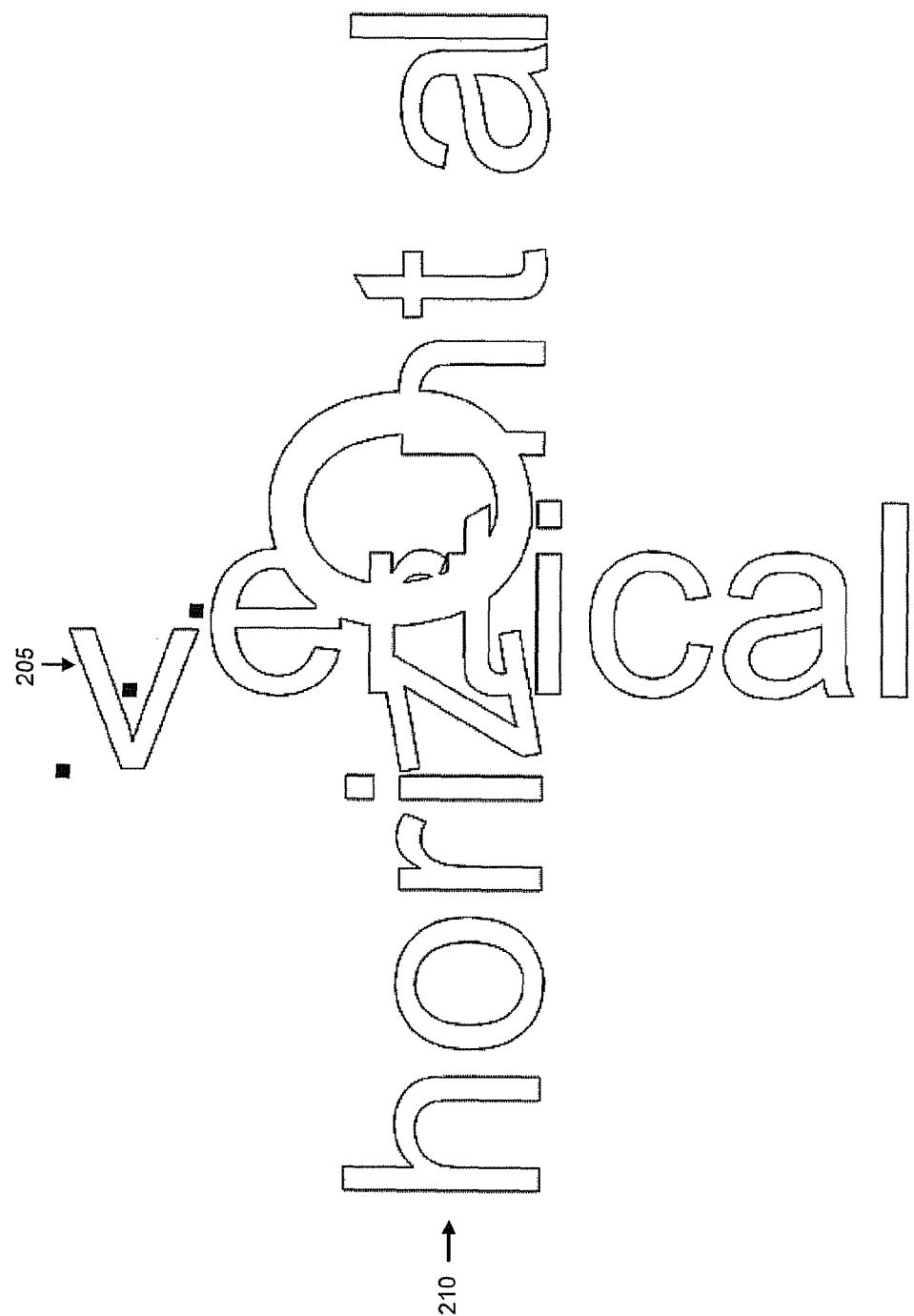

FIG. 2b illustrates an example of further editing of text strings 205, 210 following the weld operation of FIG. 2a. As can be seen in FIG. 2a, the "v" in text string 205, which includes the word "vertical," lay on an axis with the other letters in the word "vertical." However, in FIG. 2b, the "v" in "vertical" now lies on its own axis, and is not aligned with the other letters in the word "vertical." Text string 210 has similarly been edited. As can be seen in FIG. 2b, the "z" and the "o" in the word "horizontal" now lie on an axis at an angle to the axis for the other letters in the word "horizontal." Further, the "o" has been resized. Such operations would not be possible without context preserving process chains 155, such as disclosed herein.

Figure 3A:
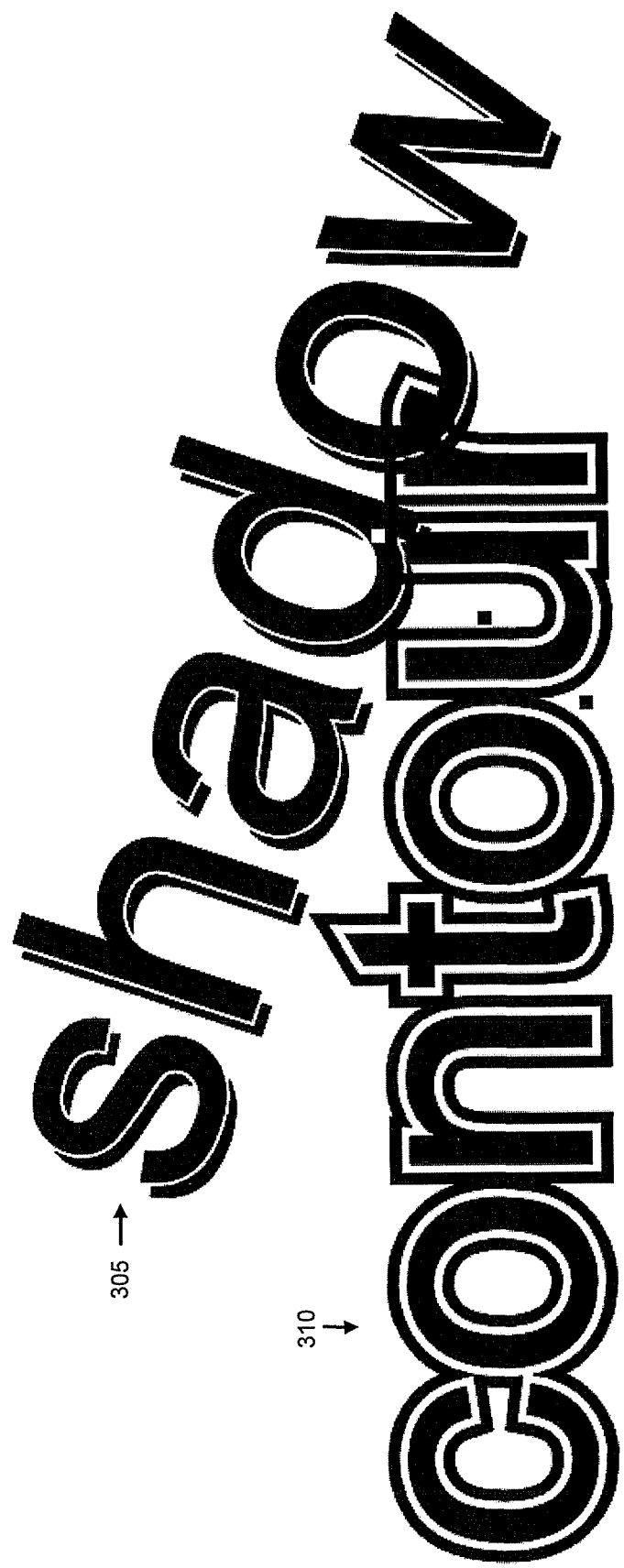
FIG. 3a provides a further example of a "weld" operation of two text strings.

FIG. 3a illustrates an example of a "weld" operation of two text strings 305, 310 performed by application 101. That is, as seen in FIG. 3a, a first text string 305 is joined to a second text string 310. As should be apparent, a shadow process 160 has been applied to text string 305, and a contour process 160 has been applied to text string 310.

Figure 3B:
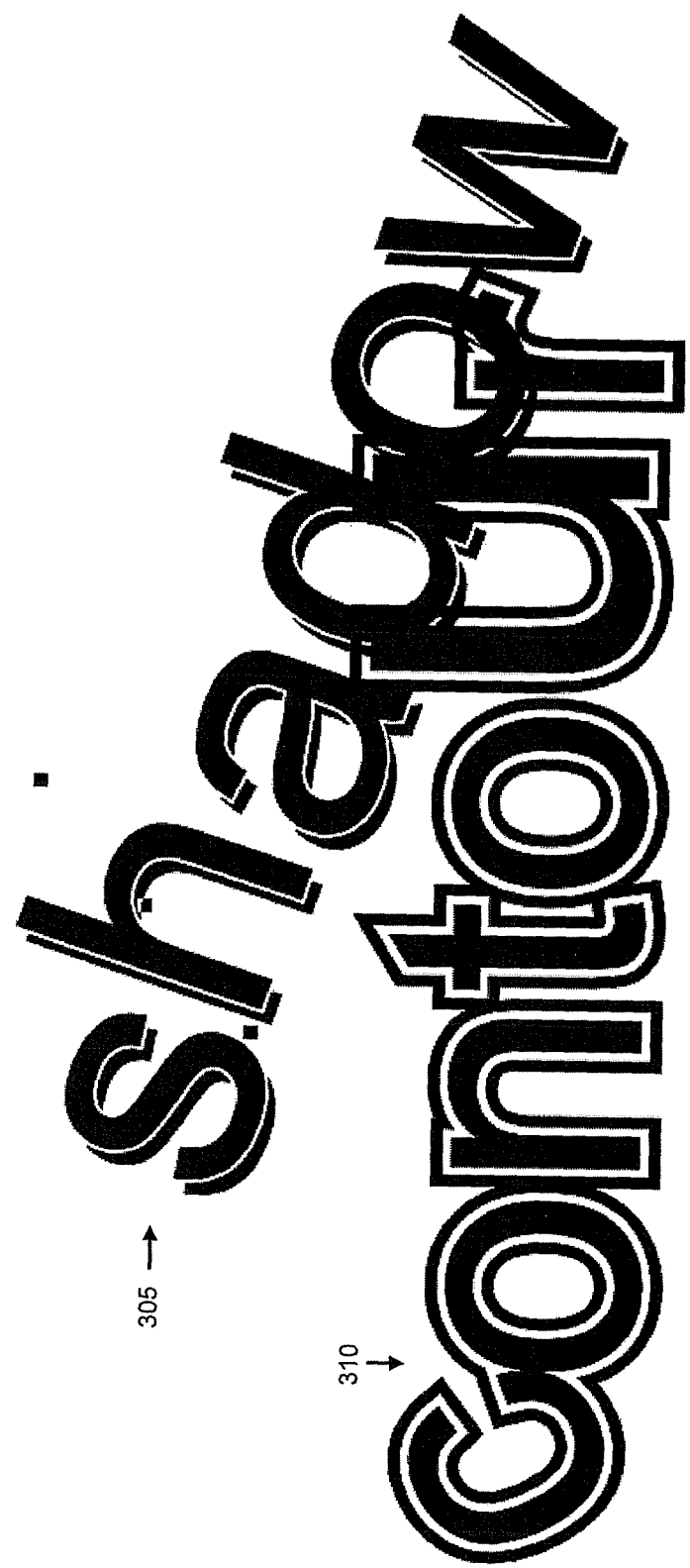

FIG. 3b illustrates an example of further editing of text strings 305, 310 following the weld operation of FIG. 3a. With respect to text string 305, editing has been performed with respect to the "s" in the word "shadow." With respect to text string 310, editing has been performed with respect to the "c" and the "u" in the word "contour." Such editing is possible because context preserving process chain 155 preserves information about text strings 305, 310, including information about each character in the text strings 305, 310.

Illustrative Applications of Process Chains

Figure 4A:
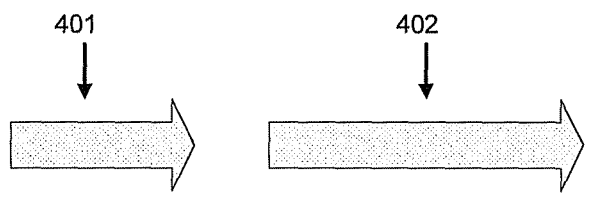
FIG. 4a illustrates an exemplary image of an arrow shape in a first state, and in a second state, the second state representing the arrow shape following the application of shape-changing, i.e., a stretching, process.
Figure 4B:
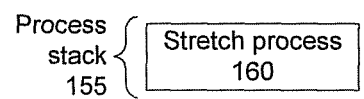

FIG. 4a illustrates an exemplary image of an arrow shape in a first state 401, and in a second state 402, the second state 402 representing the arrow shape following the application of shape-changing, i.e., a stretching, process 160. FIG. 4b illustrates a process chain 155 including a single process 160, i.e., the stretching process 160 applied as illustrated in FIG. 4a.

Figure 5A:
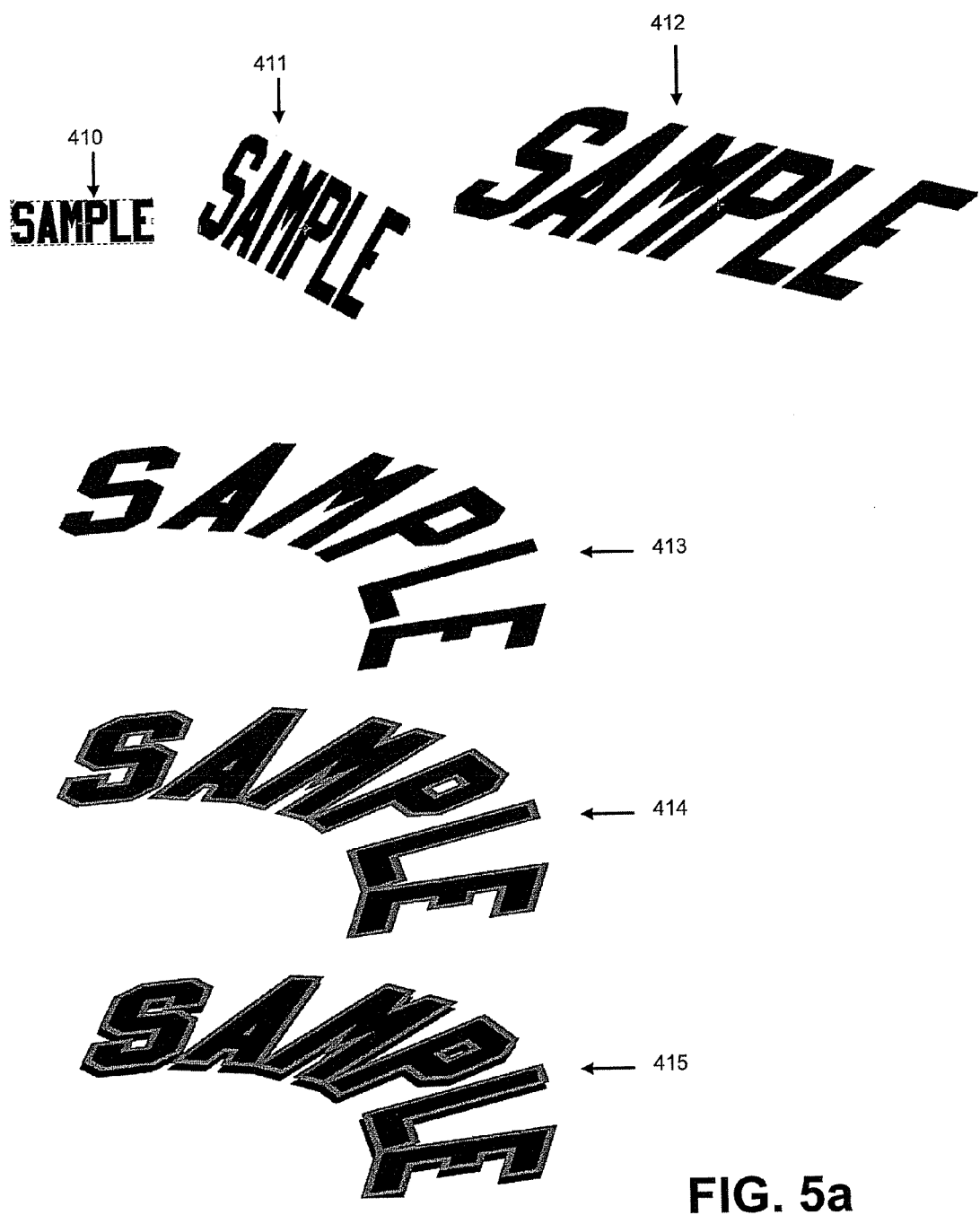
FIG. 5a illustrates images of a text string in a first state, a second state, a third state, a fourth state, a fifth state, and a sixth state.
Figures 5B, 6B:
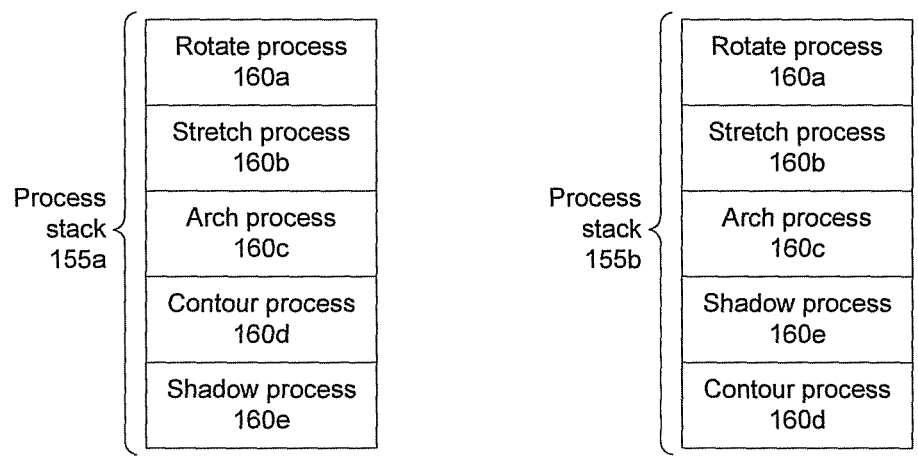

FIG. 5a illustrates an image of a text string in a first state 410, a second state 411, a third state 412, a fourth state 413, a fifth state 414, and a sixth state 415. FIG. 5b illustrates a process chain 155a that includes process 160a, 160b, 160c, 160d, 160e applied to the image of the text string shown in FIG. 5a. Process 160a has been applied to the image in its first state 410 to rotate the image in a clockwise direction, thereby producing second state 411, as may be seen in FIG. 5a. The third state 412 results from a second process 160b applied to horizontally stretch the image represented by state 411. The fourth state 413 results from a third process 160c applied to curve, or arch, the image represented by the third state 412. The fifth state 414 results from a fourth process 160d applied to outline, or contour, the image represented by the fourth state 413. The sixth state 415 results from a fifth process 160d applied to generate a shadow around the image represented by the fifth state 415.

Figure 6A:
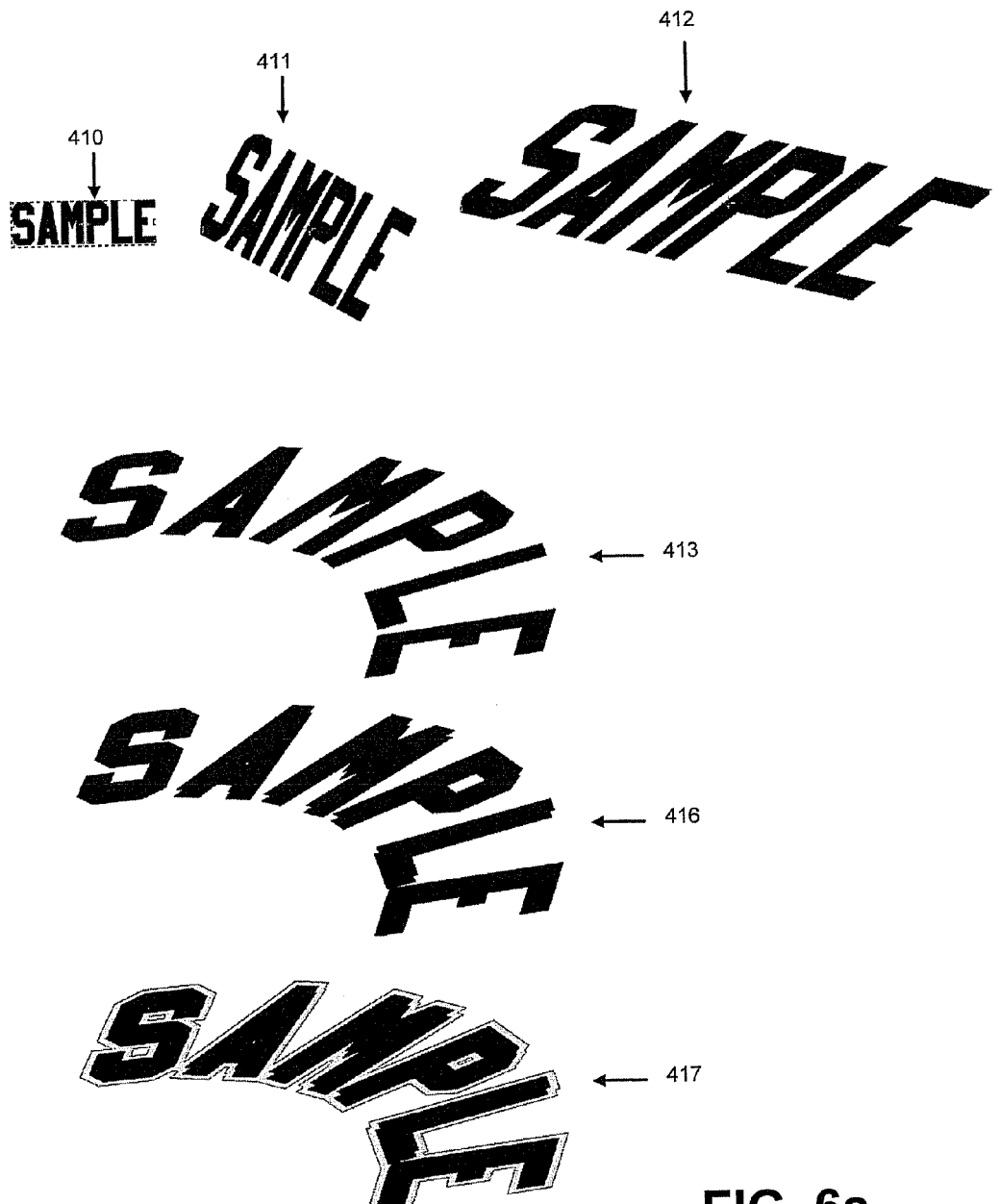
FIG. 6a illustrates images of the text string also illustrated in FIG. 5a, including a first state, a second state, a third state, a fourth state, a seventh state, and an eighth state.

FIG. 6a illustrates the image of the text string also illustrated in FIG. 5a, including first state 410, second state 411, third state 412, and fourth state 413 as shown in FIG. 5b. However, instead of fifth state 414 and sixth state 415, FIG. 6a illustrates a seventh state 416 and an eighth state 417. FIG. 6b illustrates a process chain 155b that generates states 410, 411, 412, 413, 416, and 417. As can be seen, process chain 155b includes processes 160a, 160b, 160c, 160d, and 160e included in process chain 155a of FIG. 5b. However, process chain 155b differs from process chain 155a in that the order of shadow process 160e and contour process 160d are reversed in process chain 155b, thus generating states 416 and 417 instead of states 414 and 415 shown in FIG. 5a. Reordering of process chains 155 is discussed in more detail below with reference to FIG. 11.

Figure 7A:
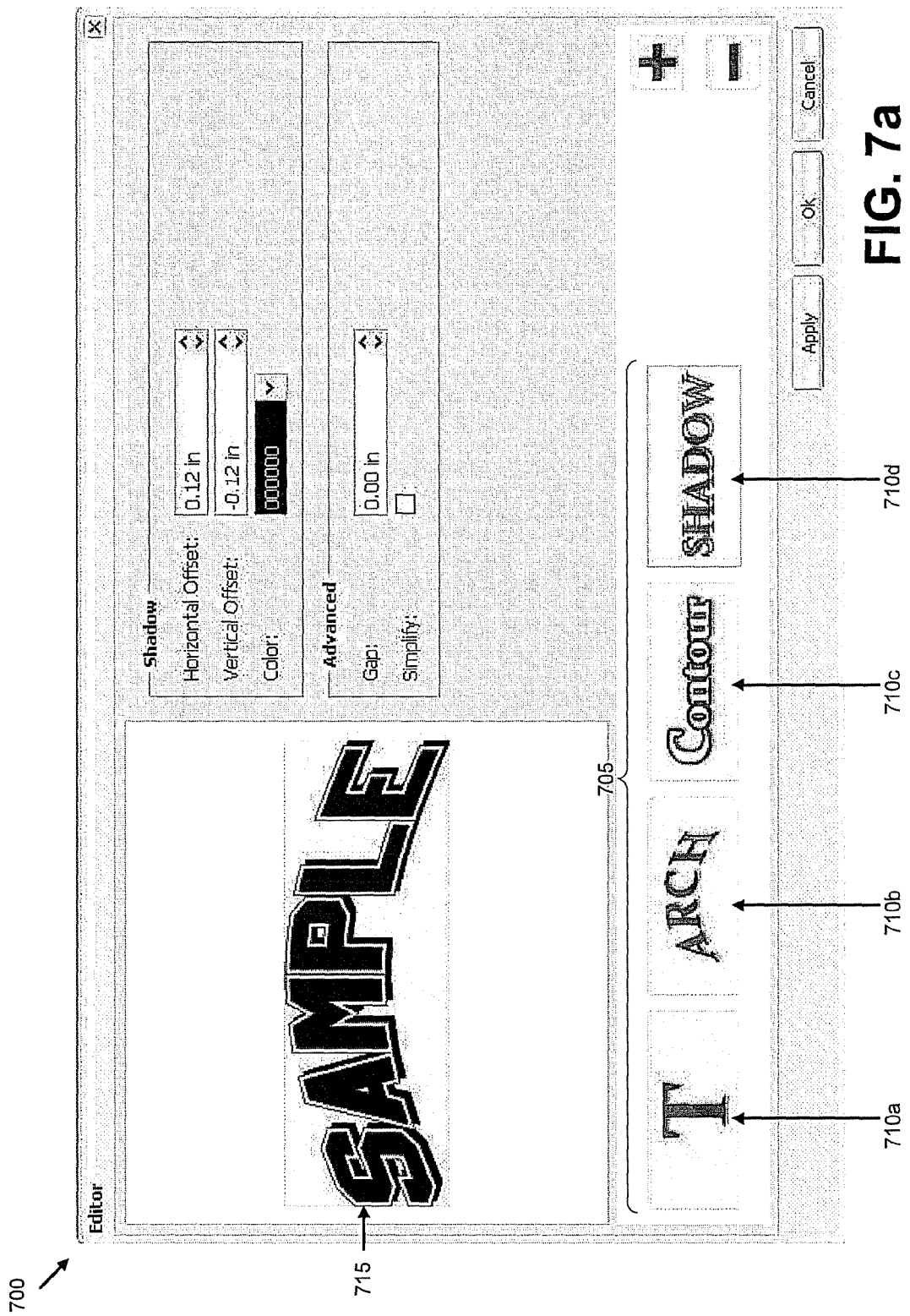
FIG. 7a illustrates an exemplary graphical user interface (GUI) provided by a web design software application.

FIG. 7a illustrates an exemplary graphical user interface (GUI) 700 provided by application 101 to client 105, e.g., via a web browser included in client 105. As seen in FIG. 7a, GUI 700 includes a series 705 of process icons 710a, 710b, 710c, 710d, each of which represents a process 160, the series 705 of process icons 710a, 710b, 710c, 710d being representative of at least some processes 160 included in a process chain 155. A graphical image 715 is displayed as a result of application of the processes 160 associated with process icons 710a, 710b, 710c, 710d. Process icons 710 may generally be added, deleted, or reordered by users. For example, users may reorders icons 710 by dragging and dropping icons to new locations in the display of a series 705.

Figure 7B:
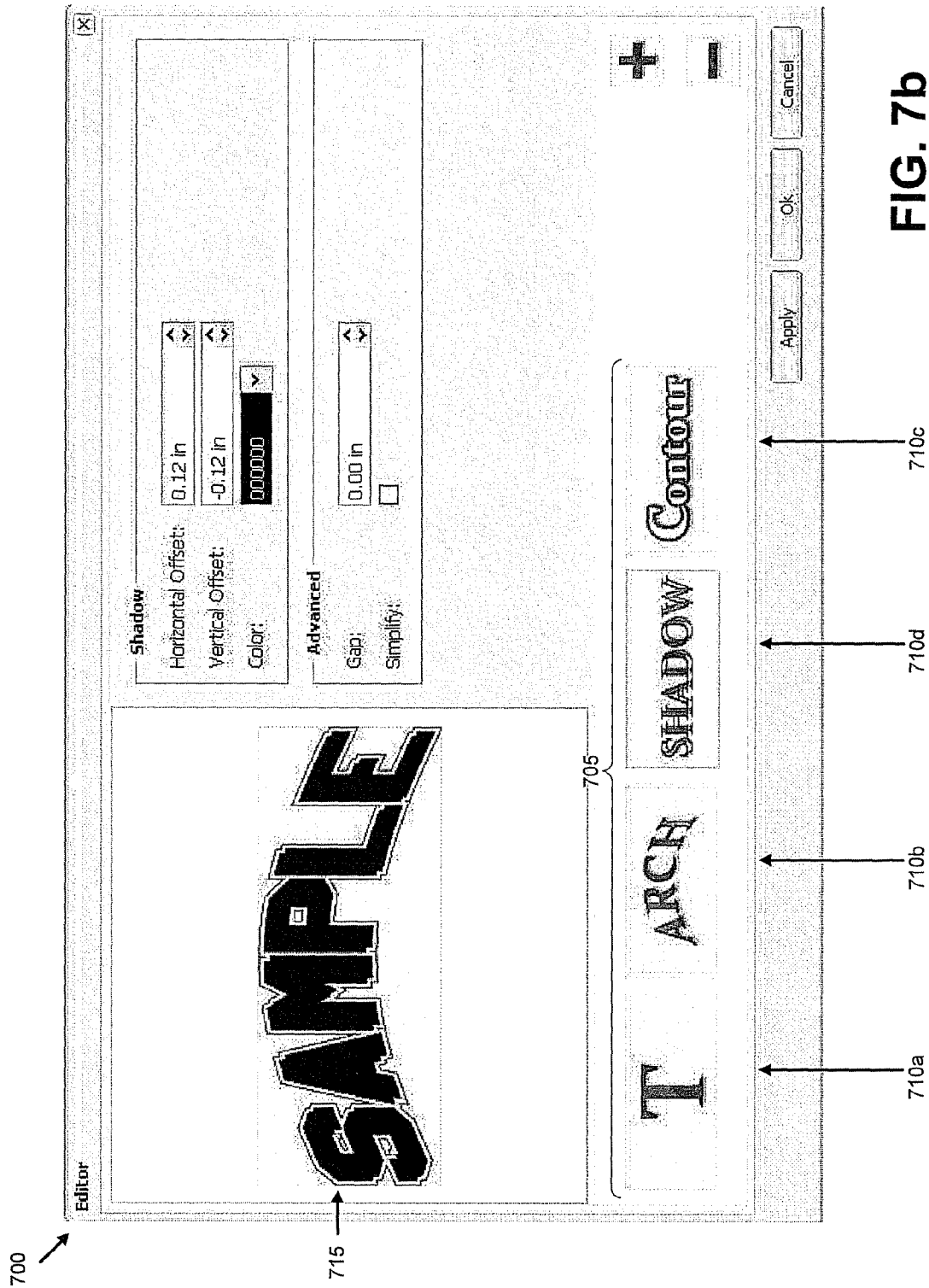
FIG. 7b provides another illustration of an exemplary graphical user interface (GUI) provided by a web design software application.

FIG. 7b provides another illustration of the exemplary GUI 700, following the reordering of icons 710 in icon series 705. As seen in FIG. 7b, GUI 700 again includes process icons 710a, 710b, 710d, 710c, although in a different order than seen in FIG. 7a, with icon 710c to the right, rather than to the left, of icon 710d. Accordingly, in FIG. 7a, the display of image 715 reflects a contour process 160 applied prior to a shadow process 160, whereas in FIG. 7b, the display of image 710 reflects the shadow process 160 having been applied prior to the contour process 160.

Exemplary Process Flows

Figure 8:
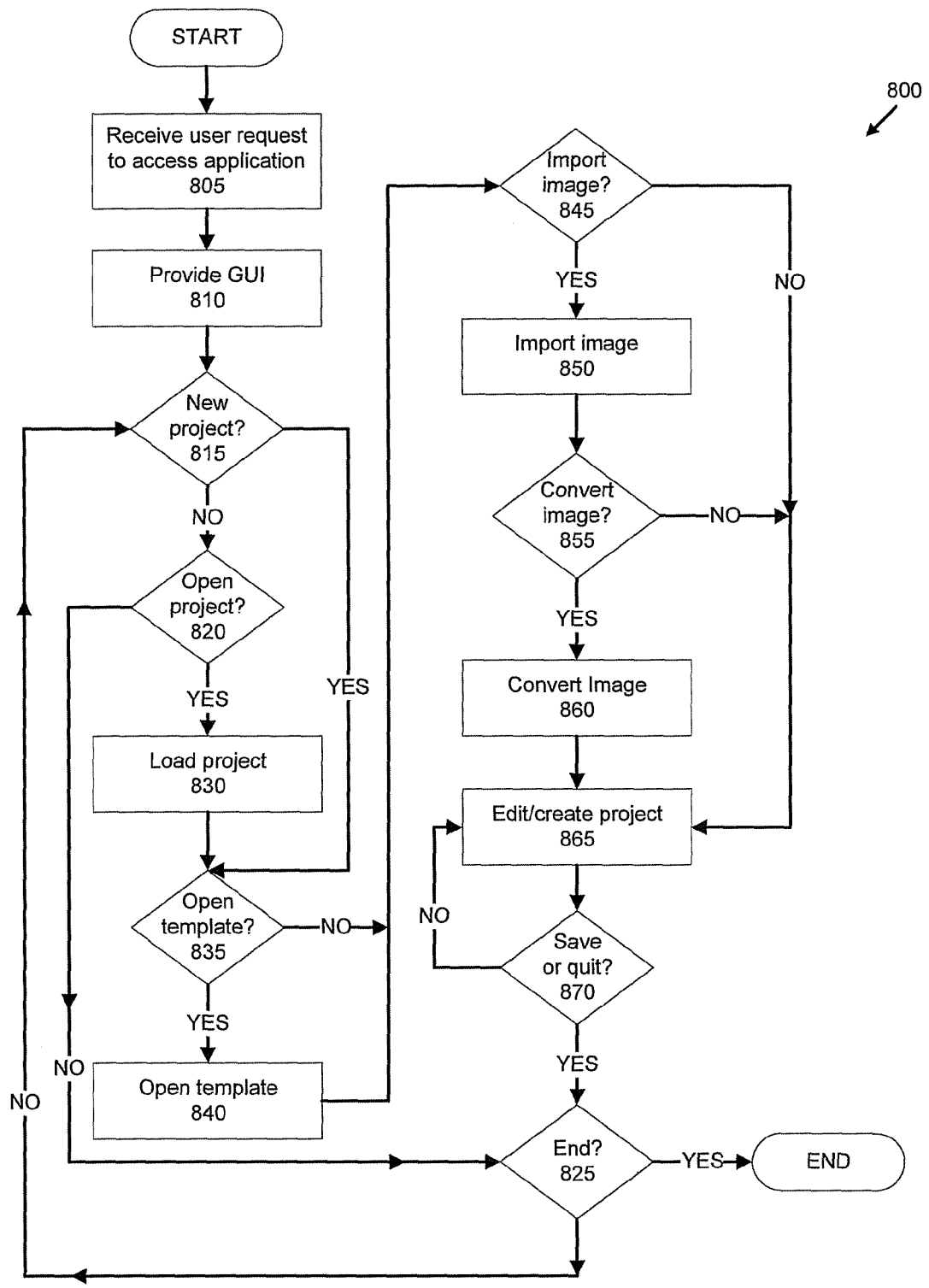
FIG. 8 illustrates an exemplary process flow for operation of a web design application.

FIG. 8 illustrates an exemplary process flow 800 for operation of web design application 101. Process 800 begins in a step 805, when application 101 receives a user request to access the application 101. For example, a user of a web browser installed on client 105 may provide a uniform resource locator (URL) or the like to access the application 101. Other access mechanisms may be used as well, such as requiring a user to provide a username, password, or similar identifying information.

Next, in step 810, application 101 provides a GUI to client 105, e.g., for display in a web browser or the like. The GUI generally provides a user with the ability to provide inputs, and receive outputs, described herein.

Next, in step 815, application 101 determines whether a user has indicated to create a new set of project data 165. If not, process 800 proceeds to step 820. Otherwise, process 800 proceeds to step 835.

In step 820, application 101 determines whether the user has elected to open an existing project. In some implementations, steps 815 and 820 are condensed into a single step in which application 101 determines whether the user has provided input to create a new project or to open an existing project. In any event, if a user does not indicate to open a new project in step 820, then step 825 is executed next. Otherwise, process 800 proceeds to step 830.

In step 825, application 101 determines whether a user has provided input to end application 101. If so, process 800 ends. Otherwise, process 800 returns to step 815.

In step 830, application 101 loads project data 165 associated with a project selected by a user in step 820. Generally, such project data 165 is stored in data store 120, and is provided as necessary to client 105 for display in the GUI, generally via network 110. As mentioned above, entities included in project data 165 may be represented in XML files. Accordingly, loading project data 165 may include application 101 interpreting one or more XML files on server 115 and then providing project data 165 to client 105 based on the interpreted XML files. Client 105 generally requires raster data to display project data 165.

In step 835, which may follow either step 815 or step 830, application 101 determines whether a user has provided input selecting to access a template 125. For example, upon creating a new set of project data 165, a user may wish to begin by accessing a template 125 that provides graphic data 130 including images desired by the user, as well as a process chain 155 that renders such images in a desired manner. Similarly, a user may wish to utilize a template 125, e.g., a predetermined process chain 155, for the rendering of images included in graphic data 130 that is part of pre-existing project data 165. If a user has selected to access, or open, a template 125, then process 800 proceeds to step 840. Otherwise, process 800 proceeds to step 845.

In step 840, which may follow step 835, the template 125 selected by the user in step 835 is provided by application 101 the network 110 to client 105. As with project data 165, generally, the template 125 is stored in the memory of server 115.

In step 845, which may follow either step 835 or step 840, application 101 determines whether a user has selected to import an image for inclusion in graphic data 130. For example, a user may wish to import a "clip art" image or some similar image. If a user has selected to import an image, process 800 proceeds to step 850. Otherwise, process 800 proceeds to step 865.

In step 850, application 101 loads, generally into a memory of server 115, the image selected for importation in step 845. Such image may then be included in the GUI provided by application 101, and displayed a client 105, along with other graphic data 130 included in project data being created, or that was loaded by application 101, e.g., as described above with respect to step 830.

Next, in step 855, application 101 determines whether it is necessary to perform a conversion of the image that was loaded in step 850. If so, process 800 proceeds to step 860. Otherwise, process 800 proceeds to step 865. A conversion step is generally necessary, because application 101 utilizes graphic data 130 both as raster data and a vector graphic data. An image to be imported, e.g., "clip art," generally will be in the form of raster data, and will require conversion to vector graphic data. Accordingly, implementations are possible in which step 865 is omitted.

In step 860, the image loaded in step 850 is converted to appropriate formats, e.g., raster data may be converted to vector graphic data, as mentioned above. Of course, application 101 generally maintains graphic data 130 in both raster data and vector graphic data formats, and therefore a converted image is generally also maintained in its original form.

In step 865, which may follow any of steps 845, 855, or 860, a user of application 101 may edit or create a project, thereby editing or creating project data 165.

Next, in step 870, application 101 determines whether input has been received to save project data 165. If not, process 800 returns to step 865. However, if input has been received to save project data 165, then process 800 saves project data 165, and proceeds to step 825. In one implementation, application 101 saves project data 165 by generating an XML file, e.g., in CDL mentioned above, and storing the XML file in server 115 or data store 120. As noted above, process 600 may end after step 825.

FIG. 9 illustrates an exemplary process flow 900 for processing graphic data 130 including type data 135 such as raster data and vector graphic data. Process flow 900 begins in a step 905, when application 101 receives a request for a process 160 to be performed with respect to a set of graphic data 130. For example, a process 160 may be included as part of an entity and/or a process chain 155, as discussed above. Accordingly, a request for a process 160 to be performed with respect to a set of graphic data 130 may be received in the course of processing an entity, including executing a process chain 155.

Next, in step 910, application 101 determines whether the graphic data 130 includes raster data. If so, process 900 proceeds to step 915. Otherwise, process 900 proceeds to step 920.

In step 915, which may follow step 910, the process 160 requested in step 905 is applied to raster data. As mentioned above, the process 160 may be any one of a variety of transformations that may be applied to a graphic image, e.g., rotation, stretching, shading, coloring, joining to another image, splitting, etc.

In step 920, which may follow step 910 or step 915, application 101 determines whether the graphic data 130 identified in step 905 includes a component of vector graphic data. If so, step 925 is executed next. Otherwise, step 930 is executed next.

In step 925, which may follow step 920, the process 160 requested in step 905 is applied to vector graphic data included in the graphic data 130 identified in step 905. Again, the process 160 may be any one of a variety of transformations and may be applied to a graphic image, such as those mentioned above.

In step 930, which may follow either step 920 or step 925, application 101 provides a set of graphic data 130 that has been transformed according to the process requested in step 905. For example, such transformed graphic data 130 may be stored in a memory of server 115, and/or may be provided to client 105 for display.

Following step 930, process 900 ends.

FIG. 10 illustrates an exemplary process flow 1000 for executing a process chain 155. Process flow 1000 begins in a step 1005 when application 101 receives an entity such as defined above that includes an input set of graphic data 130 and a process chain 155. An "input" set of graphic data 130 is simply a set of graphic data 130 provided to application 101 for processing in a process chain 155.

In step 1010, application 101 determines whether cache 175 may be used to reduce processing required for execution of the process chain 155. This determination includes determining whether the cache 175 includes a previously cached set of graphic data 130 based on the input set of graphic data 130 and the process chain 155 received in step 1005. Further, application 101 must determine whether graphic data 130 in the cache 175 may appropriately be used to fulfill a user's request. For example, if a user has provided input to perform a positional process 160, e.g., a stretching process 160, a rotation process 160, etc., and graphic data 130 has not been requested to be transformed or processed in any other way, the cache 175 may be used to eliminate the need for performing other processes 160 included in the process chain 155. If application 101 determines that the cache 175 may be used to process the entity received in step 1005, then step 1025 is executed next. However, if the cache 175 may not be used, then step 1015 is executed next.

In step 1015, which may follow step 1010, application 101 determines whether there is an argument to be executed in the process chain 155 received in step 1005. As mentioned above, an argument may be a process 160, or could be an entity including a process chain 155 and a set of graphic data 130. If there is an argument to be executed, step 1020 is executed next. Otherwise, step 1030 is executed next.

In step 1020, the argument determined in step 1015 is executed. Such execution may involve execution of a single process 160, or of a process chain 155 with a set of graphic data 130.

In step 1025, which may follow step 1010, application 101 accesses cache 175 to obtain the cache set of graphic data 130 based on the input set of graphic data 130 described above with respect to step 1005.

In step 1030, which may follow step 1013, an output set of graphic data 130 is stored in the cache 175.

In step 1035, which may follow either of steps 1025 or 1030, application 101 applies a final linear transformation and repositioning to the output set of graphic data 130, either as retrieved from the cache 175 in step 1025, or as stored in the cache 175 as in step 1030.

Following step 1035, process 1000 ends.

Figure 11:
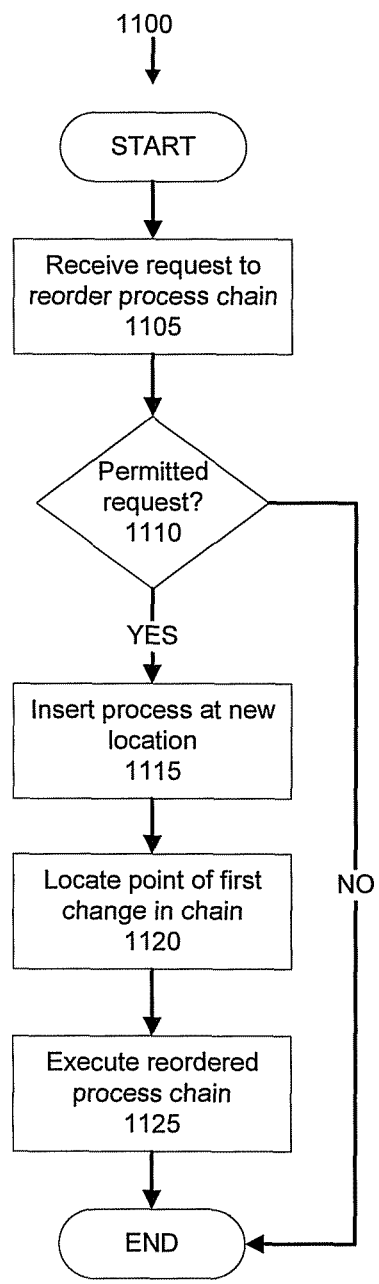
FIG. 11 illustrates an exemplary process flow for reordering a process chain.

FIG. 11 illustrates an exemplary process flow 1100 for reordering a process chain 155. The process 1100 begins a step 1105, in which application 101 receives a request to reorder a process chain 155. For example, a user could drag and drop one of process icons 710 to a new location in series 705, thereby indicating a request to reorder a process chain 155.

Next, in step 1110, application 101 determines whether the request received in step 1105 is permitted. For example, a shadow process 160 could not be moved prior to a text creation process 160 in a process chain 155, because until text is created there is nothing to shadow. Many other limitations on requests to reorder process chains 155 exist. In any event, if the request received in step 1105 is permitted, step 1115 is executed next. Otherwise, process 1100 ends.

In step 1115, which may follow step 1110, application 101 inserts the process 160 indicated in step 1105 at its new location in the indicated process chain 155. Generally, as mentioned above, application 101 includes instructions for storing process 160 and process chain 155 in a memory of server 115. Processes 160 and process chains 155 may be stored according to various data structures that may be stored in the memory of server 115. Thus, inserting a process 160 into a new location any process chain 155 generally includes reordering a data structure, e.g., a list, a tree, or the like.

Next, in step 1120, application 101 locates, in the process chain 155 indicated in step 1105, a first process 160 affected by the reordering performed in step 1115. Generally step 1120 involves traversing a data structure such as mentioned in the previous paragraph. The first process 160 affected by the reordering performed in step 1115 is generally either the process 160 that has been moved in the process chain 155, or a process 160 that was adjacent to the process 160 that has been moved. That is, when a process 160 is moved "upstream" in a process chain 155, that process 160 will represent the first point in process chain 155 that is affected by the reordering. However, when a first process 160 is moved "downstream" in a process chain 155, a second process 160a adjacent to, i.e., immediately "downstream" to, the first process 160 is generally the first point in the process chain 155 that is affected by the reordering.

Next, in step 1125, the reordered process chain 155 is executed. Generally such execution of a reordered process chain 155 requires performing processes 160 beginning with the process 160 identified as described above with respect to step 1120. Note that, in the case of a process tree 170, changes may need to be propagated or "cascaded" downstream along two or more branches of the tree 170. A re-rendered display based on graphic data 130 may then be provided via client 105. Similarly, revised graphic data 130, along with the revised process tree 155, may be saved in data store 120, e.g., as part of project data 165. As noted above, reordering a process chain 155 may result in a re-rendered display of graphic data 130 different from a first display of the graphic data 130.

Following step 1125, process 1100 ends.

It is to be understood that process 1100 could be modified, or a similar process could be employed, to add a process 160 to a process chain 155. For example, inserting a process 160 and a process chain 155 could include, analogous to step 1105, indicating the process 160 to be inserted in the process chain 155 along with a place in the process chain 155 for inserting the process 160. Further, analogous to step 1110, application 101 could determine whether the process 160 could be inserted into the process chain 155 at the requested place. If so, analogous to step 1115, the process 160 may be inserted into the process chain 155 at the requested place. Analogous to step 1120, the point of first change in the process chain 155 would be the place where the process 160 was inserted. Thus, analogous to step 1125, changes would be cascaded or propagated from that point.

CONCLUSION

Computing devices such as those used for client 105, server 115, data store 120, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as those listed above generally each include one or more memories for storing, and one or more processors for executing, instructions such as those included in a computer program such as application 101. Various steps and processes disclosed herein may be embodied in whole or in part in such instructions. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media and volatile media. Non-volatile media include, for example, optical or magnetic disks and other persistent memory. Volatile media include dynamic random access memory (DRAM), which typically constitutes a main memory. Such instructions may be transmitted by one or more transmission media, including coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A method, comprising:
   storing a set of graphical data, the set of graphical data including a first representation of an image in each of a first format and a second format;
   storing a set of processes that are organized according to a specified order;
   applying the processes, in a computer having a processor and a memory, in the specified order, to the graphical data, thereby generating a second representation of the image in each of the first format and the second format,
   whereby in the first representation and a second representation the first format is used to represent substantially all of the image, and the second format is also used to represent substantially all of the image.

2. The method of claim 1, wherein the first format is a raster format or the second format is a vector format.

3. The method of claim 1, further comprising:
   modifying the organization of the set of processes to produce a modified order; and
   applying the processes, in the modified order, to the graphical data, thereby generating a third representation of the image in each of the first format and the second format.

4. The method of claim 3, further comprising locating a first process in the set of process affected by the modified order; wherein applying the processes is performed beginning with the first process in the set of process affected by the modified order.

5. The method of claim 1, the set of processes including a first subset of processes and a second subset of processes, the specified order determining an order for executing the second subset of processes according to a place in the specified order of one of the processes in the first subset of processes.

6. The method of claim 1, further comprising:
   adding a new process to the set of processes;
   modifying the specified order according to a place in the set of processes in which the new process is added, thereby producing a modified order;
   applying the processes, including the new process, in the modified order, to the graphical data, thereby generating a third representation of the image in each of the first format and the second format.

7. A method, comprising:
   establishing, in a computer having a processor and a memory, a set of processes for transforming image data;
   specifying a first order for execution of the processes;
   rendering a first representation of the image data based on executing the processes in the first order;
   specifying a second order for execution of the processes; and
   rendering a second representation of the image data based on executing the processes in the second order.

8. The method of claim 7, wherein the image data is stored in each of a first format and a second format, the method further comprising generating the first representation of the image in the first format and the second representation of the image in the second format.

9. The method of claim 8, wherein the first format is a raster format or the second format is a vector format.

10. The method of claim 7, further comprising
specifying a third order for execution of the processes; and
rendering a third representation of the image data based on executing the processes in the third order.

11. The method of claim 7, further comprising:
adding a new process to the set of processes;
modifying the second order according to a place in the set of processes in which the new process is added, thereby producing a third order;
applying the processes, including the new process, in the third order, to the graphical data, thereby generating a third representation of the image in each of the first format and the second format.

12. A non-transitory computer-readable medium tangibly embodying computer-executable instructions for:
storing a set of graphical data, the set of graphical data including a first representation of an image in each of a first format and a second format;
storing a set of processes that are organized according to a specified order;
applying the processes, in the specified order, to the graphical data, thereby generating a second representation of the image in each of the first format and the second format,
whereby in the first representation and a second representation the first format is used to represent substantially all of the image, and the second format is also used to represent substantially all of the image.

13. The medium of claim 12, wherein the first format is a raster format or the second format is a vector format.

14. The medium of claim 12, the instructions further including instructions for:
modifying the organization of the set of processes to produce a modified order; and
applying the processes, in the modified order, to the graphical data, thereby generating a third representation of the image in each of the first format and the second format.

15. The medium of claim 14, the instructions further including instructions for:
locating a first process in the set of process affected by the modified order; wherein applying the processes is performed beginning with the first process in the set of process affected by the modified order.

16. The medium of claim 12, the set of processes including a first subset of processes and a second subset of processes, the specified order determining an order for executing the second subset of processes according to a place in the specified order of one of the processes in the first subset of processes.

17. The medium of claim 12, the instructions further including instructions for:
adding a new process to the set of processes;
modifying the specified order according to a place in the set of processes in which the new process is added, thereby producing a modified order;
applying the processes, including the new process, in the specified order, to the graphical data, thereby generating a third representation of the image in each of the first format and the second format.

18. A non-transitory computer-readable medium tangibly embodying computer-executable instructions for:
establishing a set of processes for transforming image data;
specifying a first order for execution of the processes;
rendering a first representation of the image data based on executing the processes in the first order;
specifying a second order for execution of the processes; and
rendering a second representation of the image data based on executing the processes in the second order.

19. The medium of claim 18, wherein the image data is stored in each of a first format and a second format, the instructions further including instructions for generating the first representation of the image in the first format and the second representation of the image in the second format.

20. The medium of claim 18, wherein the first format is a raster format or d the second format is a vector format.

21. The medium of claim 18, the instructions further comprising instructions for:
specifying a third order for execution of the processes; and
rendering a third representation of the image data based on executing the processes in the second order.

22. The medium of claim 18, the instructions further comprising instructions for:
adding a new process to the set of processes;
modifying the second order according to a place in the set of processes in which the new process is added, thereby producing a third order; and
applying the processes, including the new process, in the third order, to the graphical data, thereby generating a third representation of the image in each of the first format and the second format.

* * * * *